Sept. 22, 1964     S. G. GRECO ETAL     3,150,199
SEPARATION OF HYDROCARBONS
Filed Oct. 27, 1960
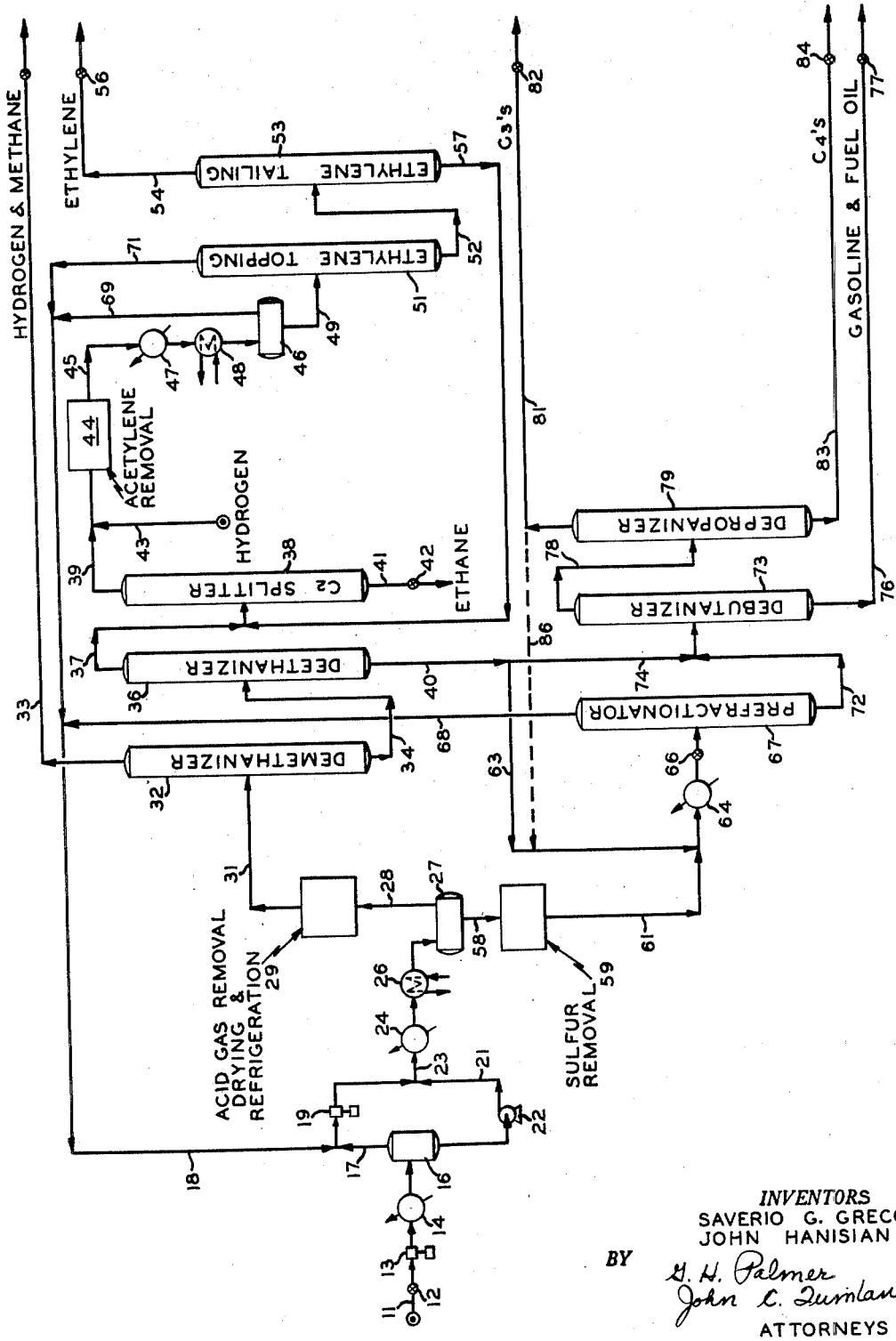
INVENTORS
SAVERIO G. GRECO
JOHN HANISIAN
BY
*G. H. Palmer*
*John C. Dunlau*
ATTORNEYS 3,150,199
SEPARATION OF HYDROCARBONS
Saverio G. Greco, Valhalla, and John Hanisian, Garden City, N.Y., assignors, by mesne assignments, to Pullman Incorporated, a corporation of Delaware
Filed Oct. 27, 1960, Ser. No. 65,494
14 Claims. (Cl. 260—677)

The present invention relates to the separation of mixtures of hydrocarbons. More particularly, it relates to the fractional separation of mixtures containing normally gaseous saturated and unsaturated hydrocarbons.

Unsaturated hydrocarbons such as ethylene, propylene and butadiene are useful building blocks in the production of a large number of chemical compounds, for example, in the preparation of various polymeric materials with well known applications as plastics and synthetic rubber. These unsaturated hydrocarbons are produced in various hydrocarbon processes of which the pyrolysis of more saturated hydrocarbons, such as ethane, propane, naphtha, etc., is but one example. In many of the processes in which unsaturated hydrocarbons are produced, a mixture of unsaturated hydrocarbons, such as ethylene, propylene, and butadiene, is obtained together with more saturated $C_2$–$C_4$ hydrocarbons. For example, in the pyrolysis of naphtha, the pyrolysis products include hydrogen, methane, acetylene, ethylene, ethane, propylene, propane, butadiene, butylenes, butanes, and heavier hydrocarbons including gasoline and fuel oil materials. Consequently, where one or more unsaturated hydrocarbons is sought in relatively pure form, it is necessary to separate it or them from a complex mixture of saturated and unsaturated hydrocarbons.

The imposition of appropriate temperatures and pressures on complex mixtures of saturated and unsaturated hydrocarbons permits fractionation of these mixtures into individual constituents and groups of constituents of relatively narrow boiling range. In the case of a complex mixture of normally gaseous saturated and unsaturated hydrocarbons, for example, $C_1$–$C_5$ hydrocarbons, it is advantageous to divide the $C_1$–$C_5$ feed into a $C_1$–$C_2$ fraction containing a minimum of higher boiling materials and a $C_3$–$C_5$ fraction containing a minimum of lower boiling materials and to further separate each fraction in separate fractionation sequences, because the former fraction requires substantial refrigeration for its fractionation while the latter fraction does not. Processes of the prior art which have failed to make a sharp separation of $C_1$–$C_2$ and $C_3$–$C_5$ fractions have thus required excessive amounts of refrigeration to recover the lighter fractions and have imposed on the low-temperature fractionation sequence used in separating the lower boiling fractions unnecessarily large throughputs, resulting in excessively large equipment.

There are at least three other important considerations involved in the fractional separation of complex mixtures of normally gaseous saturated and unsaturated hydrocarbons. The first of these follows from the fact that water is often present in the complex mixtures. At low temperatures hydrocarbon hydrates tend to form, solidifying in equipment and requiring periodic interruption of the process for cleaning. Conditions must, therefore, be controlled to preclude the formation of such hydrocarbon hydrates. On the other hand, at the relatively high temperatures normally required at some points in fractionation, the normally gaseous unsaturated hydrocarbons, particularly butadiene, tend to polymerize or otherwise deteriorate under the influence of heat also resulting in fouling and in the loss of these unsaturated hydrocarbons. For this reason high temperatures must likewise be avoided. Finally, since relatively pure ethylene, propylene and butadiene are the products sought, losses of these materials in by-product fractionation streams is advantageously avoided.

The process of the present invention is directed to a novel combination of fractionation and related separation steps so arranged and integrated as to achieve efficient separation of normally gaseous saturated and unsaturated hydrocarbons without undue losses of materials and while avoiding the aforementioned problems.

It is an object of the invention to provide a process for fractionally separating a mixture containing normally gaseous saturated and unsaturated hydrocarbons.

It is another object of the invention to provide a process for fractionally separating a mixture containing normally gaseous saturated and unsaturated hydrocarbons which avoids the formation of hydrocarbon hydrates.

A further object of the invention is to provide a process for fractionally separating a mixture containing normally gaseous saturated and unsaturated hydrocarbons in which excessive temperatures and thus deterioration of unsaturated hydrocarbons are avoided.

A still further object of the invention is to provide a process for fractionally separating a mixture containing normally gaseous saturated and unsaturated hydrocarbons with reduced refrigeration requirements.

Yet a further object of the invention is to provide a process for fractionally separating a mixture containing normally gaseous saturated and unsaturated hydrocarbons, including ethylene, in which ethylene recovery is increased.

Various other objects and advantages of the invention will appear from the following detailed discussion and description.

In accordance with the invention, the process comprises compressing a mixture containing normally gaseous saturated and unsaturated hydrocarbons to an elevated pressure, cooling and partially condensing the compressed mixture, separating a liquid fraction containing $C_2$ and heavier hydrocarbons and a vaporous fraction containing $C_2$ and lighter hydrocarbons from the cooled and partially condensed mixture in a separation zone, separating vaporous fraction from the separation zone into a $C_2$-rich fraction in a first fractionation zone, passing liquid fraction from the separation zone to a second fractionation zone, passing a $C_3$-rich fraction to the second fractionation zone to control the temperature therein, recovering an overhead fraction from the second fractionation zone containing $C_2$ hydrocarbons and recirculating the overhead fraction from the second fractionation zone to the process at a point upstream from the first fractionation zone. In a preferred form of the invention, the $C_3$-rich fraction supplied to the second fractionation zone for temperature control is a recycle stream obtained in the course of the fractionation sequence.

In another aspect of the invention, the process further comprises separating bottoms fraction containing $C_3$ and heavier hydrocarbons from the second fractionation zone into an overhead fraction comprising $C_3$–$C_4$ hydrocarbons and a bottoms fraction comprising hydrocarbons heavier than $C_4$ in a third fractionation zone and thereafter separating the overhead fraction of the third fractionation zone into a $C_3$-rich fraction overhead and a $C_4$-rich fraction bottoms in a fourth fractionation zone.

In still another aspect of the invention, a $C_3$-rich fraction is separated as a bottoms fraction from the first fractionation zone so that the aforementioned $C_2$-rich fraction separated therein is separated as an overhead fraction. The $C_2$-rich overhead fraction containing ethylene, acetylene and ethane is subjected to a further fractionation in which an overhead fraction is recovered containing ethylene and acetylene. This last-mentioned overhead fraction is then passed in the presence of hydrogen over a hydrogenation catalyst whereby the acetylene is hydrogenated to ethylene. Ethylene of high purity is recovered from the hydrogenation effluent gases.

As indicated, the feed to the process of the invention is a mixture containing normally gaseous saturated and unsaturated hydrocarbons. Normally, the mixture contains at least $C_2$–$C_4$ saturated and unsaturated hydrocarbons, namely ethylene, acetylene, ethane, propylene, propane, butadiene, butylenes, and butane. Frequently the mixture will also contain hydrogen, methane, and $C_5$ and heavier hydrocarbons, as in the case of a feed mixture from a pyrolysis process. In most such feed mixtures, some water will normally be present.

As a result of compression, cooling and partial condensing, the feed mixture is separated into vapor and liquid fractions with the vapor fraction containing a minimum of $C_3$ and heavier hydrocarbons and the liquid fraction a minimum of $C_2$ and lower boiling materials. Since the vapor-liquid separation involves an equilibrium or a close approach thereto, the liquid fraction contains some ethylene and other $C_2$ hydrocarbons. The extent to which the $C_3$ hydrocarbons present are condensed into the liquid fraction is influenced by the extent of compression and of cooling. The preferred extent of cooling is influenced by the hydrate-forming tendencies of the hydrocarbons. Below a temperature of about 60° F. hydrocarbon hydrates tend to form so that the compressed mixture should be cooled close to but not substantially below about this temperature. Preferably, the compressed mixture is cooled to a temperature between about 65° F. and about 100° F. The preferable extent of compression is influenced by the pressure required in the fractionation of the vaporous $C_2$ and lighter fraction, i.e., in subsequent demethanizing and deethanizing. Thus, where methane is present, the upper pressure limit is preferably below the critical pressure of methane so that it can be condensed by refrigeration and its autorefrigeration used in demethanizing. At the same time, the pressure is sufficiently high so that the vaporous phase separated need not be further compressed prior to low-temperature fractionation. On this basis, the elevated pressure to which the mixture is compressed should be above about 300 p.s.i.g. and preferably should be between about this value of 300 p.s.i.g. and about 650 p.s.i.g.

The vaporous fraction containing $C_2$ and lighter hydrocarbons separated as a result of partial condensing is then dried in vapor phase and substantially refrigerated so that it can be resolved into its components in a high-pressure low-temperature fractionation zone or sequence of zones. In connection with such low-temperature fractionation, at least $C_2$-rich and $C_3$-rich fractions are recovered, i.e., fractions richer in $C_2$'s and $C_3$'s than the feed. As previously mentioned, where methane and hydrogen are present in the vaporous fraction, low-temperature fractionation comprises demethanizing and deethanizing operations which separately produce a hydrogen-methane tail gas as well as $C_2$-rich and $C_3$-rich fractions.

The liquid fraction containing $C_2$ and heavier hydrocarbons also separated as a result of partial condensing is resolved into its components in a relatively high-temperature fractionation zone or sequence of fractionation zones. The liquid fraction is first subjected to a prefractionation in which substantially all of its $C_2$ content is recovered in an overhead fraction which is recirculated to the process at a point upstream from the low-temperature fractionation sequence. In this way, substantially no ethylene is ultimately lost as a result of the use of separate low- and high-temperature fractionation sequences for the vapor and liquid fractions, respectively, separated as a result of compression and cooling. A $C_3$-rich fraction is also supplied to the prefractionation operation. The addition of $C_3$ hydrocarbons enables operation of the prefractionator at temperatures above those at which hydrocarbon hydrates are formed, i.e., above about 60° F. but at temperatures below those at which the adverse effect of heat upon the unsaturated hydrocarbons present, notably butadiene, is excessively severe. In this connection, the problem of polymer deposition in the lower portion of the fractionator is a function of temperature and is progressively more severe with increasing temperature. Supplying additional $C_3$ hydrocarbons to this fractionator permits lowering the temperature which must be maintained in the lower portion of the fractionator in order to obtain the indicated separation. Bottom temperatures of about 250° F. or less are feasible in this way. The effect of supplying additional $C_3$ hydrocarbons is thus to lessen the problem of polymer deposition and thereby reduce, in some cases, requirements for provision of parallel equipment or the frequency with which equipment must be cleaned.

The foregoing mode of operation obviates the necessity for drying the liquid phase separated in the high-pressure separation zone because the liquid phase is not exposed to the low temperatures of demethanizing, deethanizing, etc., and because conditions are controlled in the prefabrication zone to avoid the formation of hydrocarbon hydrates. This feature constitutes an important advantage because drying processes for liquid hydrocarbons are relatively inefficient and costly to operate.

The bottoms fraction from the prefractionation operation, substantially free of $C_2$ hydrocarbons and lighter materials, can be further treated in any suitable way in order to recover individual components thereof, but it is preferred to further fractionate this bottoms fraction in at least two additional fractionation zones to recover $C_3$-rich and $C_4$-rich fractions from which propylene and butadiene can be recovered. According to the preferred method of operation, the bottoms fraction from the prefractionation zone is first resolved into an overhead fraction rich in $C_3$–$C_4$ hydrocarbons and a bottoms fraction rich in $C_5$ and heavier hydrocarbons. The overhead fraction rich in $C_3$–$C_4$ hydrocarbons is then resolved into a $C_3$-rich overhead fraction and a $C_4$-rich bottoms fraction. By adjusting fractionation conditions so as to debutanize prior to depropanizing, as in the aforesaid sequence, rather than the standard fractionation sequence of depronanizing and then debutanizing, it is possible to keep the temperatures to which the butadiene present is subjected relatively low and thereby lessen heat deterioration.

The $C_3$-rich fraction supplied to the prefractionator for temperature control can be obtained from an outside source but it is preferably at least a portion of the bottoms of the deethanizer in the low-temperature fractionation sequence or at least a portion of the overhead of the depropanizer in the high-temperature fractionation sequence.

With regard to the $C_2$-rich fraction recovered in the low-temperature fractionation sequence, high purity ethylene can be recovered therefrom in any suitable way. However, it is preferred to further fractionate this fraction to recover an overhead fraction containing acetylene and ethylene and a bottoms fraction containing ethane in a $C_2$-splitting operation. Acetylene is then removed from the ethylene by selective catalytic hydrogenation in the presence of at least sufficient hydrogen to provide the reaction requirement. Removal of acetylene at this point in the process rather than at some prior point is particularly advantageous in that the throughput to the hydrogenation step is relatively small and the possibility of non-selectively hydrogenating other unsaturated hydrocarbons particularly butadiene, thereafter recovered, is reduced.

For a better understanding of the invention reference is had to the following detailed description read in conjunction with the accompanying drawing which is a diagrammatic illustration in elevation of apparatus suitable for practicing a preferred embodiment of the invention.

In the drawing, a complex mixture containing normally gaseous saturated and unsaturated hydrocarbons is introduced into the process as a feed gas at about atmospheric conditions through conduit 11 with valve 12. This feed gas is a product of a process in which naptha is pyrolyzed in the presence of steam to produce ethylene, propylene and butadiene. The composition of the feed gas in conduit 11 and other principal streams in the process is given in the accompanying table.

The feed gas is compressed to an intermediate pressure by compressor 13, cooled and partially condensed in indirect heat exchange with cooling water in exchanger 14, and separated into vapor and liquid fractions in separation drum 16. The vaporous fraction from drum 16 is withdrawn in conduit 17, combined with a recycle stream supplied through conduit 18, further compressed by compressor 19, and combined with the liquid fraction separated in drum 16 which is delivered in conduit 21 by pump 22. This vapor-liquid mixture in conduit 23 is further cooled and partially condensed in exchangers 24 and 26 by indirect heat exchange with cooling water and boiling propylene refrigerant, respectively, after which it passes to separation drum 27 operating at 65° F. and 550 p.s.i.g. wherein a vapor-liquid separation takes place. Only two stages of compression have been shown though more or less stages can be employed to each the desired pressure. In the present example, four compression stages are actually used with intermediate cooling and separation of vapor-liquid fractions between stages in order that the gases will not be so compression-heated at any point as to permit heat deterioration of the unsaturated hydrocarbons present. The discharge pressures of the three intermediate stages of compression are 38, 107 and 253 p.s.i.g., respectively.

As a result of compression and cooling, a substantial portion of the steam originally present in the feed gas is condensed and permitted to form water layers in the separation drums, as drums 16 and 27, so that it can be separately withdrawn therefrom and discharged.

The vaporous fraction separated in drum 27 comprising $C_2$ hydrocarbons and lighter materials is withdrawn in conduit 28 at a rate of about 157,167 lb./hr. and subjected to acid gas removal, drying and refrigeration, all as indicated generally at 29. Any suitable acid gas removal and drying processes can be used. In this particular example, hydrogen sulfide and small amounts of carbon dioxide are removed by contacting the gases with an aqueous caustic solution followed by contact with water in order to remove the caustic. The gases are then dried by passage over an alumina absorbent. The vapor-phase drying process is carried out to substantial completion in order that ice and hydrocarbon hydrates will not form in subsequent low temperature equipment. The gases are then refrigerated to about $-80°$ F. and partially liquefied by indirect heat exchange in a series of exchangers employing successively lower boiling refrigerants.

The cold, dried, sulfur-free vapor-liquid mixture from unit 29 passes in conduit 31 to a fractionation column 32 maintained at 493 p.s.i.g., a top temperature of $-113°$ F. and a bottom temperature of 60° F. so that substantially all of the methane and hydrogen and substantially none of the ethylene originally present in the feed in conduit 31 is recovered overhead of column 32 through conduit 33 and delivered from the process as a tail gas at a rate of about 34,670 lb./hr. In connection with fractionation column 32 and the other fractionation columns shown in the drawing, no reflux and reboiling means have been shown in the interest of simplicity but it is to be understood that suitable overhead condensers, reflux drums and reboilers are required. Similarly, many pumps, valves, control instruments and the like are omitted, the addition of all such elements being obvious to one skilled in the art. It should also be understood that the demethanizing function of column 32 and the functions of the other fractionation columns in the process can be accomplished in one or more fractionation columns and that a single column is shown also in the interest of simplicity.

A bottoms liquid fraction comprising $C_2$ and $C_3$ hydrocarbons is recovered from fractionation column 32 and passed at a rate of about 119,387 lb./hr. through conduit 34 to fractionation column 36 operating at 398 p.s.i.g., a bottom temperature of 171° F. and a top temperature of 19° F. Fractionation column 36 resolves its feed from conduit 34 into a $C_2$-rich fraction overhead in conduit 37 and a $C_3$-rich fraction bottoms in conduit 40.

Overhead vapors from fractionation column 36 pass in conduit 37 at a rate of about 76,642 lb./hr., are combined with a recycle stream in conduit 57, and pass to a fractionation column 38, operating at 98 p.s.i.g., a bottom temperature of $-40°$ F. and a top temperature of $-77°$ F., in which the $C_2$-rich feed is resolved into an ethylene-acetylene fraction overhead in conduit 39 and an ethane fraction bottoms in conduit 41 with valve 42. The ethane fraction in conduit 41 is recovered from the process at a rate of about 23,376 lb./hr.

The ethylene-acetylene fraction recovered overhead of fractionation column 38, compressed by means not shown, passes in conduit 39 at a rate of about 57,201 lb./hr., is joined with a hydrogen-rich stream supplied at a rate of approximately 359 lb./hr. through conduit 43, and is subjected to selective catalytic hydrogenation in acetylene removal unit 44 in which a fixed bed of catalyst is maintained at a suitable temperature for selective hydrogenation of acetylene. In the present example, the catalyst used is a standard commercial catalyst, Dow Type P, temperatures are initially about ambient with the fresh catalyst and a pressure of about 290 p.s.i.g. is maintained. Under these conditions, acetylene is substantially completely removed by selective hydrogenation. As previously indicated, it is preferred to conduct acetylene removal at this point rather than at some prior point such as prior to the demethanizer where hydrogen would already be available, because the throughput to the hydrogenation unit is thereby appreciably reduced as are the possibilities of non-selectively hydrogenating other unsaturated hydrocarbons present, such as butadiene, thereafter recovered. The rate at which hydrogen is supplied to the unit 44 is influenced by the nature of the catalyst but in all cases must be at least sufficient to provide the stoichiometric hydrogen requirement of the reaction.

Acetylene-free gases are recovered from unit 44 in conduit 45 at about 275° F. and are cooled and partially condensed by indirect heat exchange in exchangers 47 and 48 against cooling water and boiling propylene refrigerant, respectively. A vapor-liquid separation is effected in separation drum 46 operating at $-27°$ F.

and 275 p.s.i.g. The liquid fraction separated in drum 46 is withdrawn in conduit 49 and pumped at a rate of about 57,540 lb./hr. to a fractionation column 51 operating at 345 p.s.i.g., a bottom temperature of $-5°$ F. and a top temperature of $-15°$ F. Conditions in column 51 are controlled so that substantially all of the materials lower boiling than ethylene appear in the overhead fraction in conduit 71. The bottoms liquid fraction containing substantially all of the ethylene introduced into fractionation column 51 is passed through conduit 52 at a rate of about 55,188 lb./hr. to a fractionation column 53 operating at 275 p.s.i.g., a bottom temperature of $-6°$ F. and a top temperature of $-25°$ F. High purity ethylene is recovered as the overhead fraction of column 53 and delivered from the process in conduit 54 with valve 56 at a rate of approximately 51,238 lb./hr. The bottoms liquid fraction from column 53 principally comprising ethane but recoverable quantities of ethylene is recirculated from column 53 to column 36 through conduit 57 at a rate of about 3935 lb./hr.

Returning now to the liquid fraction initially separated in the process in drum 27, this fraction is withdrawn in conduit 58 and passed to a sulfur-removal unit 59 at a rate of about 69,318 lb./hr. Sulfur-removal can be accomplished by any suitable process. In unit 59, the liquid fraction is contacted with an aqueous caustic solution to remove sulfur and thereafter contacted with water to remove caustic. The sulfur-free liquid fraction is passed from unit 59 in conduit 61 to a fractionation column 67 after being heated from 73° F. to 160° F. by indirect heat exchange with steam in exchanger 64 followed by reduction in pressure across valve 66. Upstream from exchanger 64, approximately 7050 lb./hr. of $C_3$-rich bottoms liquid fraction from column 36 via conduits 40 and 63 are added to the liquid fraction flowing in conduit 61 to column 67. Fractionation column 67 operates at 285 p.s.i.g. and is maintained at a bottom temperature of 250° F. and a top temperature of 65° F. under which conditions all of the $C_2$ hydrocarbons and lighter materials originally present in the combined feed to column 67 are driven into the overhead fraction. The addition of the $C_3$-rich fraction has the effect of substantially reducing the bubble point of the material in the lower portion of column 67 so that adequate stripping vapors can be obtained for fractionation at substantially reduced reboiler temperatures. Consequently, the heat-sensitive materials therein, particularly butadiene, are not subjected to temperatures appreciably higher than 250° F. and the aforementioned fouling problems are reduced. Sufficient $C_3$ hydrocarbons are added to assure a bottoms temperature at or below about 250° F. Still more $C_3$ hydrocarbons can be added to produce even lower bottoms temperatures if desired.

Overhead vapors comprising $C_2$ hydrocarbons are withdrawn from column 67 at 65° F., i.e., at a temperature above hydrate-formation temperatures, and are passed at a rate of about 30,264 lb./hr. in conduit 68 to conduit 18 by which they are recirculated to the process at a point upstream from the low-temperature fractionation sequence, viz., to the inlet side of compressor 19 at which point the pressure is about 250 p.s.i.g. Ethylene-containing vapors are also recovered in conduit 69 from drum 46 and in conduit 71 from column 51, aggregating about 2352 lb./hr., and are recirculated after expansion to about 250 p.s.i.g. and heat exchange to recover their refrigeration via conduit 18 to the low-temperature fractionation sequence. Each of the aforesaid ethylene-containing streams thus recirculated, and particularly the overhead vapors recovered from column 67, contribute to substantially improve the ultimate yield of ethylene in conduit 54 by reducing ethylene losses in by-product streams.

The precise point or points upstream from the low temperature fractionation sequence to which the recovered $C_2$-containing streams are recirculated is principally a matter of engineering expedience. Thus, in the present example the recycle streams reenter the process at an intermediate compression stage because they are at pressures substantially lower than those maintained either in column 32 or column 36. Since the overhead fraction from prefractionator 67 will normally contain some $C_3$ hydrocarbons which can be recovered, this fraction should not be recirculated to the low-temperature fractionation sequence at a point downstream from deethanizer 36. It is preferred to recycle all of these streams to a point upstream from unit 29 so that water and carbon dioxide present can be removed prior to the low-temperature fractionation sequence.

The bottoms liquid fraction from column 67 free of $C_2$ and lighter hydrocarbons passes in conduit 72 at a rate of about 46,104 lb./hr. to a fractionation column 73 operating at 195 p.s.i.g., a bottom temperature of 340 F. and a top temperature of 131° F. The balance of the bottoms liquid fraction from column 36 withdrawn in conduit 40 and not passed to column 67 is also fed to column 73 via conduit 74 at a rate of about 35,695 lb./hr. A bottoms liquid fraction comprising $C_5$ and heavier hydrocarbons, i.e., gasoline and fuel oil materials, is withdrawn from column 73 in conduit 76 with valve 77 and delivered at a rate of about 33,961 lb./hr. as a product of the process. The overhead fraction recovered from column 73 comprises substantially all of the $C_3$ and $C_4$ hydrocarbons present in the feed to column 73. This overhead fraction is pumped through conduit 78 to a fractionation column 79 operating at 253 p.s.i.g., a bottom temperature of 212° F. and a top temperature of 113° F., in which the $C_3$–$C_4$ feed is resolved into a $C_3$-rich fraction overhead and a $C_4$-rich fraction bottoms. The overhead fraction comprising predominantly propylene and propane is recovered from column 79 in conduit 81 with valve 82 at a rate of about 31,513 lb./hr. and is in suitable condition for the recovery of high-purity propylene. The bottoms fraction comprising predominantly butadiene, butylenes, and butanes is recovered from column 79 in conduit 83 with valve 84 at a rate of about 16,349 lb./hr. and is in suitable condition for the recovery of high-purity butadiene.

In some cases, it is preferred to employ a portion of the $C_3$-rich overhead fraction from fractionation column 79 to supply the additional $C_3$ requirements of fractionation column 67. In these instances a part of the overhead fraction from column 79 is diverted through conduit 86 (shown dashed) to conduit 61. If all of the additional $C_3$ hydrocarbons are supplied through conduit 86, conduit 63 can be omitted and all of the bottoms fraction from column 36 passed through conduits 40 and 74 to column 73.

In the course of its fractionation in columns 73 and 79 the butadiene present in the feed to column 73 is not subjected to high temperatures, i.e., temperatures above about 250° F., so that the possibility of its deterioration under the influence of heat is substantially lessened. If on the other hand, conditions in columns 73 and 79 were maintained so as to depropanize and then debutanize, as in standard fractionation sequences, it would be necessary to subject the butadiene present to substantially higher temperatures in order to fractionate efficiently, whereby butadiene would not only be lost from the process through thermal deterioration but the polymeric products of the thermal deterioration would foul the equipment.

The foregoing sequence of fractionation and other separation steps so cooperate in combination that yields of each of the valuable normally gaseous unsaturated hydrocarbons, ethylene, propylene, and butadiene, are enhanced while problems of hydrocarbon-hydrate formation and thermal deterioration of unsaturated hydrocarbons are substantially reduced.

TABLE

*Composition of Principal Streams, Mol Percent*

| Conduit component | 11 | 28 | 58 | 33 | 40 | 39 | 41 | 43 | 49 | 52 | 54 | 68 | 78 | 81 | 83 |
|---|---|---|---|---|---|---|---|---|---|---|---|---|---|---|---|
| Water | 5.1 | 0.1 | (1) | | | | | | | | | | | | |
| $N_2$+CO | (1) | 0.8 | (1) | 1.7 | | | | 3.9 | 0.1 | | | (1) | | | |
| $H_2S$ | (1) | (1) | (1) | | | | | | | | | | | | |
| $O_2$ | (1) | 0.2 | (1) | 0.3 | | | | | | | | (1) | | | |
| Hydrogen | 15.6 | 18.4 | 0.6 | 38.9 | | | | 78.7 | | | | 0.9 | | | |
| Methane | 21.5 | 28.3 | 6.3 | 58.3 | | 0.4 | | 12.4 | 0.8 | 0.1 | (1) | 10.0 | | | |
| Acetylene | 0.5 | 0.4 | | | | 1.5 | | | | | | | | | |
| Ethylene | 27.5 | 27.8 | 20.1 | 0.8 | 0.2 | 96.1 | 1.7 | 0.2 | 96.4 | 97.1 | 99.9 | 31.8 | 0.1 | 0.2 | |
| Ethane | 7.5 | 10.6 | 10.2 | (1) | 0.2 | 2.0 | 96.7 | 4.8 | 2.7 | 2.8 | (1) | 16.2 | 1.7 | 2.4 | |
| Methylacetylene | 0.3 | 0.3 | | | 1.9 | | | | | | | | 0.7 | 1.0 | |
| Propadiene | 0.1 | 0.1 | | | 0.8 | | | | | | | | | | |
| Propylene | 10.1 | 9.8 | 23.2 | | 72.5 | | 1.5 | | | | | 36.3 | 65.2 | 90.8 | 0.6 |
| Propane | 0.3 | 0.5 | 1.4 | | 4.1 | | | | | | | 2.1 | 3.7 | 5.0 | 0.3 |
| Butadiene | 1.8 | 0.7 | 5.0 | | 5.2 | | | | | | | 1.0 | 10.5 | 0.2 | 36.4 |
| Butylenes | 3.0 | 1.3 | 7.8 | | 9.5 | | 0.1 | | (1) | (1) | | 1.7 | 17.3 | 0.4 | 59.9 |
| Butanes | 0.1 | (1) | 0.2 | | 0.4 | | | | | | | | 0.6 | (1) | 2.1 |
| $C_5$+heavier | 6.6 | 0.7 | 25.2 | | 5.4 | | | | | | | | 0.2 | | 0.7 |

[1] Trace.

It will be apparent that specific temperatures and pressures to be maintained in the various steps of the process can be easily determined by those skilled in the art from the foregoing and based upon the precise composition of the feed gas and purity requirements of the various product streams. It will be evident that pressures and temperatures are interrelated and that it is not practical to set forth all the possible variations. Those conditions given are particularly appropriate where the process streams have the compositions given in the table, these being an example of a preferred system with a particular feed gas.

Various alterations and modifications of the process of this invention will be apparent to those skilled in the art and may be used without departure from the scope of the invention.

We claim:

1. A process for fractionally separating a mixture containing normally gaseous saturated and unsaturated hydrocarbons which comprises compressing said mixture to an elevated pressure between about 300 and about 650 p.s.i.g., cooling and partially condensing said compressed mixture at a temperature between about 65° F. and about 100° F., separating a liquid fraction containing $C_2$ and heavier hydrocarbons and a vaporous fraction containing $C_2$ and lighter hydrocarbons from said cooled and partially condensed mixture in a separation zone, separating vaporous fraction from said separation zone into a $C_2$-rich fraction in a first fractionation zone, passing liquid fraction from said separation zone to a second fractionation zone, passing a $C_3$-rich fraction to said second fractionation zone to control the temperatures therein, recovering an overhead fraction from said second fractionation zone containing $C_2$ hydrocarbons and recirculating said overhead fraction from said second fractionation zone to said process at a point upstream from said first fractionation zone.

2. A process for fractionally separating a mixture containing normally gaseous saturated and unsaturated hydrocarbons which comprises compressing said mixture to a pressure between about 300 and about 650 p.s.i.g., cooling said compressed mixture to a temperature between about 65° F. and about 100° F., separating a liquid fraction containing $C_2$ and heavier hydrocarbons and a vaporous fraction containing $C_2$ and lighter hydrocarbons from said compressed and cooled mixture in a separation zone, separating vaporous fraction from said separation zone into a $C_2$-rich fraction in a first fractionation zone, separating liquid fraction from said separation zone into an overhead $C_2$-rich fraction in a second fractionation zone maintained at a temperature below about 250° F. by supplying $C_3$ hydrocarbons to said second fractionation zone, recirculating said overhead $C_2$-rich fraction from said second fractionation zone to said process at a point upstream from said first fractionation zone.

3. A process for fractionally separating a mixture containing normally gaseous saturated and unsaturated hydrocarbons which comprises compressing said mixture to an initial pressure between about 300 and about 650 p.s.i.g., cooling said compressed mixture to a temperature between about 65° F. and about 100° F., separating a liquid fraction containing $C_2$ and heavier hydrocarbons and a vaporous fraction containing $C_2$ and lighter hydrocarbons from said compressed and cooled mixture in a separation zone, separating vaporous fraction from said separation zone into a $C_2$-rich fraction in a first fractionation zone maintained at a pressure below said initial pressure, recovering substantially all of the $C_2$ hydrocarbons in said liquid fraction from said separation zone in the overhead fraction of a second fractionation zone maintained at temperatures between about 65° F. and about 250° F. by supplying $C_3$ hydrocarbons to said second fractionation zone, recirculating said overhead fraction from said second fractionation zone to said process at a point upstream from said first fractionation zone.

4. A process for fractionally separating a mixture containing normally gaseous saturated and unsaturated hydrocarbons which comprises compressing said mixture to an elevated pressure between about 300 and about 650 p.s.i.g., cooling and partially condensing said compressed mixture at a temperature between about 65° F. and about 100° F., separating a liquid fraction containing $C_2$ and heavier hydrocarbons and a vaporous fraction containing $C_2$ and lighter hydrocarbons from said cooled and partially condensed mixture in a separation zone, separating vaporous fraction from said separation zone into a $C_2$-rich fraction and a $C_3$-rich fraction in a first fractionation zone, passing at least a portion of said $C_3$-rich fraction from said first fractionation zone and liquid fraction from said separation zone to a second fractionation zone, recovering an overhead fraction from said second fractionation zone containing $C_2$ hydrocarbons and recirculating said overhead fraction from said second fractionation zone to said process at a point upstream from said first fractionation zone.

5. A process for fractionally separating a mixture containing normally gaseous saturated and unsaturated hydrocarbons which comprises compressing said mixture to an initial pressure between about 300 and about 650 p.s.i.g., cooling said compressed mixture to a temperature between about 65° F. and about 100° F., separating a liquid fraction containing $C_2$ and heavier hydrocarbons and a vaporous fraction containing $C_2$ and lighter hydrocarbons from said compressed and cooled mixture in a separation zone, separating vaporous fraction from said separation zone into a $C_2$-rich fraction and a $C_3$-rich fraction in a first fractionation zone, recovering substantially all of the $C_2$ hydrocarbons in said liquid fraction from said separation zone in the overhead fraction of a second fractionation zone maintained at a temperature below about 250° F. by supplying at least a portion of said $C_3$-rich fraction from said first fractionation zone to said second fractionation zone, recirculating said overhead fraction from said second fractionation zone to said process at a point upstream from said first fractionation zone.

6. A process for fractionally separating a mixture containing normally gaseous saturated and unsaturated hydrocarbons which comprises compressing said mixture to an elevated pressure, cooling and partially condensing said compressed mixture, separating a liquid fraction containing $C_2$ and heavier hydrocarbons and a vaporous fraction containing $C_2$ and lighter hydrocarbons from said cooled and partially condensed mixture in a separation zone, separating vaporous fraction from said separation zone into a $C_2$-rich fraction in a first fractionation zone, passing liquid fraction from said separation zone to a second fractionation zone, passing a $C_3$-rich fraction to said second fractionation zone to control the temperatures therein, separating an overhead fraction containing $C_2$ hydrocarbons and a bottoms fraction containing $C_3$ and heavier hydrocarbons in said second fractionation zone, recirculating said overhead fraction from said second fractionation zone to said process at a point upstream from said first fractionation zone, separating bottoms fraction from said second fractionation zone into an overhead fraction containing $C_3$ and $C_4$ hydrocarbons and a bottoms fraction containing hydrocarbons heavier than $C_4$ in a third fractionation zone and separating overhead fraction from said third fractionation zone into a $C_3$-rich overhead fraction and a $C_4$-rich bottoms fraction in a fourth fractionation zone.

7. A process for fractionally separating a mixture containing normally gaseous saturated and unsaturated hydrocarbons which comprises compressing said mixture to an elevated pressure, cooling and partially condensing said compressed mixture, separating a liquid fraction containing $C_2$ and heavier hydrocarbons and a vaporous fraction containing $C_2$ and lighter hydrocarbons from said cooled and partially condensed mixture in a separation zone, separating vaporous fraction from said separation zone into a $C_2$-rich fraction in a first fractionation zone, passing liquid fraction from said separation zone to a second fractionation zone, passing a $C_3$-rich fraction obtained as described below to said second fractionation zone to control the temperatures therein, separating an overhead fraction containing $C_2$ hydrocarbons and a bottoms fraction containing $C_3$ and heavier hydrocarbons in said second fractionation zone, recirculating said overhead fraction from said second fractionation zone to said process at a point upstream from said first fractionation zone, separating bottoms fraction from said second fractionation zone into an overhead fraction containing $C_3$ and $C_4$ hydrocarbons and a bottoms fraction containing hydrocarbons heavier than $C_4$ in a third fractionation zone, separating overhead fraction from said third fractionation zone into a $C_3$-rich overhead fraction and a $C_4$-rich bottoms fraction in a fourth fractionation zone and passing at least a portion of said $C_3$-rich overhead fraction from said fourth fractionation zone to said second fractionation zone to supply said $C_3$-rich fraction for temperature control.

8. A process for fractionally separating a mixture containing normally gaseous saturated and unsaturated hydrocarbons which comprises compressing said mixture to an elevated pressure between about 300 and about 650 p.s.i.g., cooling and partially condensing said compressed mixture at a temperature between about 65° F. and about 100° F., separating a liquid fraction containing $C_2$ and heavier hydrocarbons and a vaporous fraction containing $C_2$ and lighter hydrocarbons from said cooled and partially condensed mixture in a separation zone, drying vaporous fraction from said separation zone to remove substantially all of the water present, further cooling said dried vaporous mixture, separating a $C_2$-rich fraction from said dried and cooled vaporous fraction in a first fractionation zone, passing liquid fraction from said separation zone to a second fractionation zone, passing a $C_3$-rich fraction to said second fractionation zone to control the temperatures therein, recovering an overhead fraction from said second fractionation zone containing $C_2$ hydrocarbons and recirculating said overhead fraction from said second fractionation zone to said process at a point upstream from said drying step.

9. A process for fractionally separating a mixture containing normally gaseous saturated and unsaturated hydrocarbons which comprises compressing said mixture to an elevated pressure in a series of compression stages with intermediate cooling between each of said series of compression stages, cooling and partially condensing said compressed mixture, separating a liquid fraction containing $C_2$ and heavier hydrocarbons and a vaporous fraction containing $C_2$ and lighter hydrocarbons from said cooled and partially condensed mixture in a separation zone, separating vaporous fraction from said separation zone into a $C_2$-rich fraction in a first fractionation zone, passing liquid fraction from said separation zone to a second fractionation zone maintained at a pressure below said elevated pressure, passing a $C_3$-rich fraction to said second fractionation zone to control the temperatures therein, recovering an overhead fraction from said second fractionation zone containing $C_2$ hydrocarbons and recirculating said overhead fraction from said second fractionation zone to said process at an intermediate stage of compression.

10. A process for fractionally separating a mixture containing normally gaseous saturated and unsaturated hydrocarbons which comprises compressing said mixture to an elevated pressure, cooling and partially condensing said compressed mixture, separating a liquid fraction containing $C_2$ and heavier hydrocarbons and a vaporous fraction containing $C_2$ and lighter hydrocarbons from said cooled and partially condensed mixture in a separation zone, separating vaporous fraction from said separation zone into a $C_1$-rich overhead fraction and a $C_2$-rich bottoms fraction in a first fractionation zone, separating bottoms fraction from said first fractionation zone into a $C_2$-rich overhead fraction and a $C_3$-rich bottoms fraction in a second fractionation zone, separating overhead fraction from said second fractionation zone into an overhead fraction containing ethylene and acetylene and a bottoms fraction containing ethane in a third fractionation zone, contacting overhead fraction from said third fractionation zone in the presence of added hydrogen with a suitable catalyst for the selective hydrogenation of acetylene in an acetylene conversion zone, separating effluent from said acetylene conversion zone into an overhead fraction containing materials lower boiling than ethylene in a fourth fractionation zone, passing liquid fraction from said separation zone to a fifth fractionation zone, passing a $C_3$-rich fraction to said fifth fractionation zone to control the temperatures therein, recovering an overhead fraction from said fifth fractionation zone containing $C_2$ hydrocarbons and recirculating the overhead fraction from said fifth fractionation zone and the overhead fraction from said fourth fractionation zone to said process at a point upstream from said first fractionation zone.

11. A process as defined in claim 10 which further comprises subjecting vaporous fraction from said separation zone to acid gas removal, drying and refrigeration prior to the introduction of said vaporous fraction into said first fractionation zone and recirculating the overhead fractions of said fourth and fifth fractionation zones to said process at a point upstream from said acid gas removal, drying and refrigeration steps.

12. A process as defined in claim 10 which further comprises recovering a bottoms fraction from said fifth fractionation zone containing $C_3$ and heavier hydrocarbons, separating bottoms fraction from said fifth fractionation zone into an overhead fraction containing $C_3$ and $C_4$ hydrocarbons and a bottoms fraction containing hydrocarbons heavier than $C_4$ in a sixth fractionation zone and separating overhead fraction from said sixth fractionation zone into a $C_3$-rich overhead fraction and a $C_4$-rich bottoms fraction in a seventh fractionation zone.

13. A process as defined in claim 12 in which said fifth fractionation zone is maintained at temperatures between about 65° F. and about 250° F. and in which the $C_3$-rich fraction supplied to said fifth fractionation zone for temperature control is at least a portion of said $C_3$-rich bottoms fraction from said second fractionation zone.

14. A process as defined in claim 12 in which said fifth fractionation zone is maintained at temperatures between about 65° F. and about 250° F. and in which the $C_3$-rich fraction supplied to said fifth fractionation zone for temperature control is at least a portion of said $C_3$-rich overhead fraction from said seventh fractionation zone.

References Cited in the file of this patent
UNITED STATES PATENTS

| | | |
|---|---|---|
| 2,500,353 | Gantt | Mar. 14, 1950 |
| 2,514,294 | Rupp | July 4, 1950 |
| 2,848,522 | Gilmore | Aug. 19, 1958 |
| 2,886,611 | King et al. | May 12, 1959 |
| 2,909,578 | Anderson et al. | Oct. 20, 1959 |
| 2,938,934 | Williams | May 31, 1960 |